June 3, 1952  F. JARABEK  2,599,057

FISH STRINGER

Filed May 24, 1950

INVENTOR
Frank Jarabek
BY
His Attorneys

Patented June 3, 1952

2,599,057

UNITED STATES PATENT OFFICE 2,599,057

FISH STRINGER

Florian Jarabek, Cleveland, Ohio

Application May 24, 1950, Serial No. 164,005

6 Claims. (Cl. 224—7)

My invention relates to a fish line stringer and relates more particularly to a stringer which may be secured to a boat and means associated therewith.

It is an object of my invention to provide a stringer having a body portion formed in an improved manner so that it may easily be placed through the gills of fish and the fish retained on a line associated therewith in an improved manner.

A further object of my invention is to provide a fish stringer which can be detachably or lockingly secured to the gunnels of a boat or to the side of a boat or to the seat of a boat, etc.

A still further object of my invention is to provide a fish stringer which will be weighted so that caught fish strung thereon will be kept under the water while on the stringer.

It is an object of my invention also to provide a fish stringer which will be simple in construction, inexpensive to manufacture, and highly efficient in use.

Other objects of my invention and the invention itself will become more readily apparent from a purview of the appended description, in which description reference will be made to the accompanying drawings, in which drawings.

Figure 1:
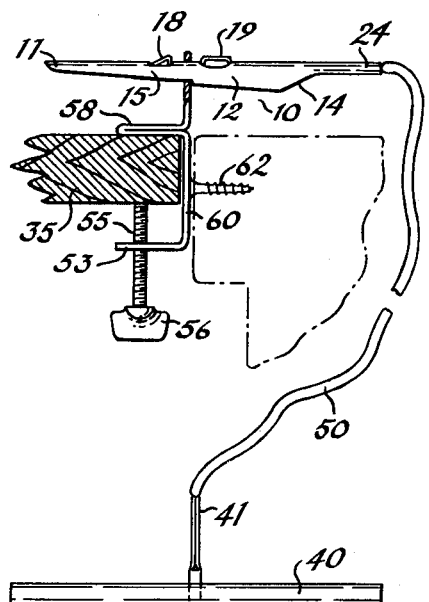
Fig. 1 is a side plan view of the complete fish stringer of my invention attached by means of a bracket to the gunnel of a boat, a portion of the line being broken away.
Figure 2:
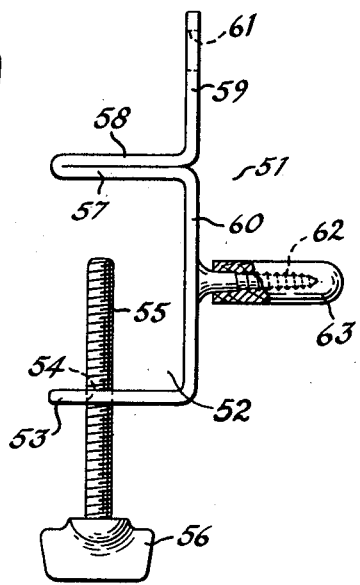
Fig. 2 is an enlarged side plan view of the fastening means of Fig. 1.
Figure 3:
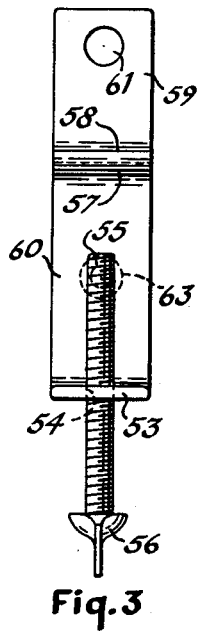
Fig. 3 is an end plan view of the bracket of Fig. 2.

Referring now to the drawings in all of which like parts are designated by like reference characters, at 10 I show a generally tapered inverse U-shaped fish stringer body portion. Said body portion 10 initiates in a tapered needle end portion 11 merging into a step-down tapered middle portion 12, a stepped shoulder 13 being provided at an intermediate portion of the tapered portion 12, an upwardly tapered rear portion 14 terminating in a semi-tubular end 24 adapted to be crimped over the upper end of a stringer line 50. To the lower end of the stringer line 50 a weight 40 is secured as hereinafter more fully described.

Figure 4:
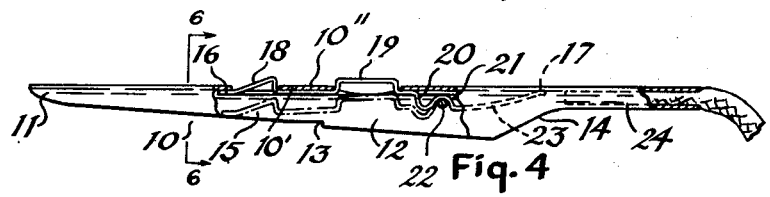
Fig. 4 is an enlarged side plan view of the fish stringer of Fig. 1, certain portions being shown broken away for greater clarification and the spring being shown in full and dotted lines to illustrate different operative portions thereof.
Figure 5:
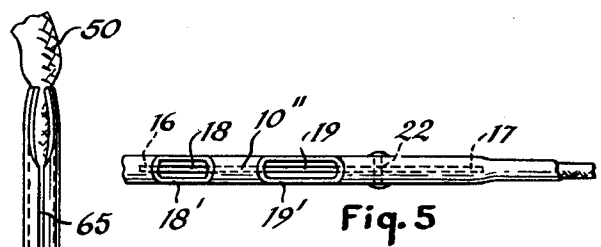
Fig. 5 is a top plan view of a portion of the stringer disclosure of Fig. 4.
Figure 6:
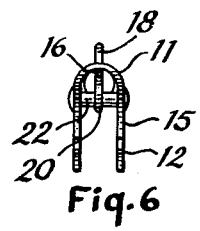
Fig. 6 is a view taken from the line 6—6 of Fig. 4.

As best shown in Fig. 4, a spring 15 is disposed longitudinally within the stringer body portion 10, being secured thereto by means of rivet means 22 disposed transversely through the intermediate portion 12 of the stringer portion 10, the spring being journalled upon said rivet means and disposed between such rivet means and the upper wall 10' of the body portion, the rearmost end 17 of the spring being adapted to bear against the upper wall 10' when the opposite end of the spring is manually depressed from the full line position to the position shown in dotted lines in Fig. 4.

The spring is provided with a forward free end 16, an angular tapered portion 18 adjacent thereto, a U-shaped portion 23, an inverse U-shaped portion 19 and a pair of reversely shaped adjacent curved surfaces 20 and 21. The tapered portion 18 of the spring is adapted to project upwardly through an aperture 18' in the upper wall 10' of the stringer 10 and the portion 19 of said spring projects similarly through a similarly formed aligned aperture 19' in said upper wall 10'.

The stringer 10 is held by a bracket 51, which bracket is provided with a U-shaped yoke portion 52, the lower arm 53 of said yoke being provided with a threaded aperture 54 therein into which a threaded bolt 55 is projected. The bolt 55 is provided with a wing nut 56 at its outer end. The bracket is bent back as at 58 upon the upper arm 57 of the yoke 52 and is provided with a vertically extending arm 59 disposed in the plane of the web 60 of the yoke 52. A circular perforation is formed in the central portion of the upper end of the arm 59 and the stringer 10 is projected into the same by thrusting the needle end 11 of the stringer 10 therethrough, depressing the portion 18 of the spring and the bracket is caused to rest upon that portion 10" of the upper wall disposed between the apertures 18', 19' of the stringer 10. The bolt 55 is turned to fasten the bracket 51 to the gunnel or other portion 35 of the boat either prior to the insertion of the stringer therein or thereafter.

The bracket 51 is provided with a woodscrew 62 centrally of the web 60 which projects outwardly thereof and said screw is provided for optional mounting of the bracket upon a portion of the boat to adapt the bracket for different mounting. A bumper 63 is preferably disposed thereover when the screw is not in use.

The projection of the spring portions 18 and 19 upwardly of the stringer 10 at either side of the apertured portion 61 of the bracket acts to securely fasten the stringer 10 to the bracket and to prevent accidental dislodgment therefrom. Upon manual depression of the portion 19 of the spring, however, the spring assumes the dotted line position shown in Fig. 4 and the stringer may be removed from its association with the bracket. Hence, additional fish may be added to the string by simply detaching the stringer from the bracket in the manner described, threading the fish on the stringer and replacing the stringer in the bracket.

Figure 7:
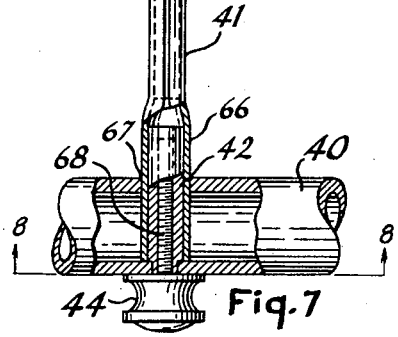
Fig. 7 is an enlarged view of the lowermost weighted end of the stringer of Figs. 1 and 4.
Figure 8:
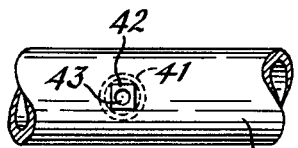
Fig. 8 is a bottom view taken from the line 8—8 of Fig. 7.

A weight 40 is secured to the free end of the stringer line 50 by means of a tubular element 41 having a split tubular portion 65 crimped over the line as shown in Fig. 7 and a closed tubular portion 66 having a preferably square sleeve 42 having a screw-threaded cylindrical opening 43, the tubular portion 66 being projected through a cylindrical bore 67 in the tubular weight 40 and being secured thereto by means of a screw-threaded bolt 68 having a thumb nut 44 integrally secured thereto, the bolt 68 being projected within the opening 43 within the tubular portion 66. Heavier or lighter weights may be placed upon this end of the line 50, as the fisherman may prefer.

Although I have described my invention in connection with a preferred embodiment thereof, it will be obvious that numerous and extensive departures may be made from the embodiment of my invention herein illustrated and described, without, however, departing from the spirit of my invention and the scope of the appended claims.

I claim:

1. In a fish line stringer of the type wherein the stringer has a stringer line secured thereto, said stringer line having a weight secured at its opposite end, the provision of a body portion having a longitudinally extending curved upper surface and a pair of longitudinally extending sides, said sides being generally tapered from a portion of less width at the forward end thereof to a portion of greater width at the rearward portion thereof, said upper curved surface being provided with a pair of aligned slots, longitudinally extending spring means, means disposed within the body portion, said spring means being journalled thereon, said spring means being provided with a pair of upwardly extending portions each adapted to protrude through a different one of said slots.

2. In a fish line stringer of the type having a stringer line secured to one end of the stringer, said stringer line having a weight secured to the opposite end of the stringer line, a bracket adapted to be secured to a portion of a boat, said bracket being provided with an aperture therethrough, the combination of a stringer body portion having a longitudinally extending curved upper surface and a pair of longitudinally extending sides, said sides being generally tapered from a portion of less width at the forward end thereof to a portion of greater width at a rearward portion thereof, said upper curved surface being provided with a pair of aligned slots, longitudinally extending spring means, means disposed within the body portion, said spring means being journalled thereon, said spring means being provided with a pair of upwardly extending portions each adapted to protrude through a different one of said slots, the forward end of said stringer body portion adapted to be inserted within said bracket aperture, the spring portion protruding through the first of said slots adapted to be depressed by the walls surrounding said aperture wherefore the bracket is passed thereover, said bracket seating upon a portion of the stringer body portion located between said pair of slots.

3. In a fish line stringer of the type having a stringer line secured to one end of the stringer, said stringer line having a weight secured to the opposite end of the stringer line, a bracket adapted to be secured to a portion of a boat, said bracket being provided with an aperture therethrough, the combination of a stringer body portion having a longitudinally extending curved upper surface and a pair of longitudinally extending sides, said sides being generally tapered from a portion of less width at the forward end thereof to a portion of greater width at a rearward portion thereof, said upper curved surface being provided with a pair of aligned slots, longitudinally extending spring means, means disposed within the body portion, said spring means being journalled thereon, said spring means being provided with a pair of upwardly extending portions each adapted to protrude through a different one of said slots, the forward end of said stringer body portion adapted to be inserted within said bracket aperture, the spring portion protruding through the first of said slots adapted to be depressed by the walls surrounding said aperture wherefore the bracket is passed thereover, said bracket seating upon a portion of the stringer body portion located between said pair of slots, the upwardly protruding spring portions acting as a locking means to retain the stringer body portion within its mounting upon the bracket.

4. In a fish line stringer of the type having a stringer line secured to one end of the stringer, said stringer line having a weight secured to the opposite end of the stringer line, a bracket adapted to be secured to a portion of a boat, said bracket being provided with an aperture therethrough, the combination of a stringer body portion having a longitudinally extending curved upper surface and a pair of longitudinally extending sides, said sides being generally tapered from a portion of less width at a rearward portion thereof, said upper curved surface being provided with a pair of aligned slots, longitudinally extending spring means, means disposed within the body portion, said spring means being journalled thereon, said spring means being provided with a pair of upwardly extending portions each adapted to protrude through a different one of said slots, the forward end of said stringer body portion adapted to be inserted within said bracket aperture, the spring portion protruding through the first of said slots adapted to be depressed by the walls surrounding said aperture wherefore the bracket is passed thereover, said bracket seating upon a portion of the stringer body portion located between said pair of slots, the upwardly protruding spring portions acting as a locking means to retain the stringer body portion within its mounting upon the bracket, screw means adapted to be associated with said bracket whereby said bracket may be attached to a portion of a boat.

5. In a fish line stringer device, a body portion comprising a tapered needle end portion, a stepped down tapered middle portion, a stepped shoulder provided at an intermediate portion of the middle portion, an upwardly tapered rear portion terminating in a semi-tubular end, a stringer line adapted to be crimped within said tubular end portion, a spring disposed longitudinally within the stringer body portion and secured thereto, said spring being provided with a said free end, an angular tapered portion adjacent thereto, an inverse U-shaped portion, a pair of apertures in the upper wall of the stringer body portion, the tapered portion of the spring adapted to be projected through the more forwardly disposed of said apertures and the inverse U-shaped portion of the spring being adapted to be projected upwardly through the rearmost of said apertures.

6. In a fish line stringer device, a body portion comprising a tapered needle end portion, a stepped down tapered middle portion, a stepped shoulder provided at an intermediate portion of the middle portion, an upwardly tapered rear portion terminating in a semi-tubular end, a stringer line adapted to be crimped within said tubular end portion, a spring disposed longitudinally within the stringer body portion and secured thereto, said spring being provided with a said free end, an angular tapered portion adjacent thereto, an inverse U-shaped portion, a pair of apertures in the upper wall of the stringer body portion, the tapered portion of the spring adapted to be projected through the more forwardly disposed of said apertures and the inverse U-shaped portion of the spring being adapted to be projected upwardly through the rearmost of said apertures, a bracket provided with a U-shaped yoke portion and a vertically extending arm disposed in the plane of the web of said yoke having a circular perforation into which the stringer body portion is projected by thrusting the middle end therethrough, depressing the tapered portion of the spring, the bracket being caused to rest upon a portion of the upper wall of the body portion disposed between said apertures, depression of the inverse U-shaped portion of the said spring permitting the stringer body portion to be removed from its association with said bracket.

FLORIAN JARABEK.

REFERENCES CITED

The following references are of record in the file of this patent:

UNITED STATES PATENTS

| Number | Name | Date |
| --- | --- | --- |
| 529,758 | Sippy | Nov. 27, 1894 |
| 2,455,766 | Harvey | Dec. 7, 1948 |
| 2,491,008 | Lake | Dec. 13, 1949 |
| 2,518,915 | Loree | Aug. 15, 1950 |
| 2,519,528 | Williamson | Aug. 22, 1950 |